United States Patent
Yang et al.

(10) Patent No.: US 11,899,244 B2
(45) Date of Patent: Feb. 13, 2024

(54) WAVELENGTH SELECTIVE SWITCH

(71) Applicant: Accelink Technologies Co., Ltd., Wuhan (CN)

(72) Inventors: Liu Yang, Wuhan (CN); Rui Yang, Wuhan (CN); Zhilin Yuan, Wuhan (CN); Jinping Guo, Wuhan (CN); Fan Wang, Wuhan (CN); Yuhong Ma, Wuhan (CN); Yingyi Xuan, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 3 days.

(21) Appl. No.: 17/764,387

(22) PCT Filed: Dec. 27, 2019

(86) PCT No.: PCT/CN2019/129435
§ 371 (c)(1),
(2) Date: Mar. 28, 2022

(87) PCT Pub. No.: WO2021/017398
PCT Pub. Date: Feb. 4, 2021

(65) Prior Publication Data
US 2022/0342156 A1 Oct. 27, 2022

(30) Foreign Application Priority Data

Jul. 29, 2019 (CN) .......................... 201910691466.3

(51) Int. Cl.
*G02B 6/26* (2006.01)
*G02B 6/35* (2006.01)
*G02B 6/34* (2006.01)

(52) U.S. Cl.
CPC ............... *G02B 6/354* (2013.01); *G02B 6/34* (2013.01)

(58) Field of Classification Search
CPC . G02B 6/354; G02B 6/34; G02B 6/32; G02B 6/26
See application file for complete search history.

(56) References Cited

U.S. PATENT DOCUMENTS 9,182,601 B2 * 11/2015 Inoue .................. G02B 6/29311
9,641,917 B2 *  5/2017 Yan ..................... H04Q 11/0005
(Continued)

FOREIGN PATENT DOCUMENTS

| CN | 101156098 A | 4/2008 |
|---|---|---|
| CN | 103197388 A | 7/2013 |

(Continued)

OTHER PUBLICATIONS

Chinese Search Report for Chinese Application No. 2019106914663 dated Feb. 25, 2020, 2 pgs.

(Continued)

*Primary Examiner* — Jennifer Doan
(74) *Attorney, Agent, or Firm* — Lei Fang, Esq.; Smith Tempel Blaha LLC

(57) ABSTRACT

A wavelength selective switch, including: an optical fiber array, an optical signal processing device and an output selection device. The optical fiber array includes multiple dual-core optical fibers arranged in parallel, one dual-core optical fiber being used for inputting two optical signals; the optical signal processing device is located at an output end of the optical fiber array and is used for splitting the two optical signals into sub-signals of different wavelengths and projecting the sub-signals of different wavelengths to different spectral band regions in the output selection device; and the output selection device is located at the rear end of the optical signal processing device, and is used for processing the sub-signals projected to the spectral band regions, so as to respectively perform output selection on the (Continued)

sub-signals split from two optical signals, thereby achieving a dual-switch function.

11 Claims, 2 Drawing Sheets

(56) References Cited

U.S. PATENT DOCUMENTS

| | | | |
|---|---|---|---|
| 9,913,008 | B1 | 3/2018 | Keyworth et al. |
| 2006/0093264 | A1 | 5/2006 | Tabuchi |
| 2006/0228072 | A1 | 10/2006 | Davis et al. |
| 2012/0328238 | A1 | 12/2012 | Inoue et al. |
| 2015/0323312 | A1* | 11/2015 | Sezerman ............ G01B 11/16 356/32 |
| 2016/0165324 | A1 | 6/2016 | Zhao et al. |

FOREIGN PATENT DOCUMENTS

| | | |
|---|---|---|
| CN | 103608708 A | 2/2014 |
| CN | 104597572 A | 5/2015 |
| CN | 104620155 A | 5/2015 |
| CN | 109001865 A | 12/2018 |
| CN | 109212766 A | 1/2019 |
| CN | 110426789 A | 11/2019 |
| EP | 1168012 A2 | 1/2002 |
| JP | 2016213559 A | 12/2016 |

OTHER PUBLICATIONS

International Search Report for Application No. PCT/CN2019/129435 dated Apr. 26, 2020, 2 pgs.

* cited by examiner

WAVELENGTH SELECTIVE SWITCH

CROSS-REFERENCE TO RELATED APPLICATION(S)

The present application is a U.S. National entry under 35 U.S.C. § 371 of International Application PCT/CN2019/129435, filed Dec. 27, 2019, which claims the priority of a Chinese patent application No. 201910691466.3 filed on Jul. 29, 2019, the disclosure of which is hereby incorporated by reference herein in its entirety.

TECHNICAL FIELD OF THE DISCLOSURE

The present disclosure relates to the technical field of optical communication, and in particular, to a wavelength selective switch.

BACKGROUND

Wavelength division multiplexing (WDM) is a common optical layer networking technology at present, and it is easy to realize the transmission capacity of Gbit/s or even Tbit/s by multiplexing different wavelengths in one optical fiber for transmission. The reconfigurable optical add drop multiplexer (ROADM), as a core optical switching device in a WDM network, can configure any wavelength at any port, and a wavelength selective switch is a core device in the reconfigurable optical add-drop multiplexing system and can realize the routing function of the wavelength channel of the optical network.

However, the requirements of the new generation of wavelength selective switch for the size and integration property of the device are gradually increased.

SUMMARY

In view of this, the embodiments of the present disclosure expect to provide a wavelength selective switch.

The technical solutions of the present disclosure are implemented as follows.

The present disclosure provides a wavelength selective switch comprising an optical fiber array, an optical signal processing device, and an output selection device; wherein
the optical fiber array comprises multiple dual-core optical fibers arranged in parallel, any one of the dual-core optical fibers being used for inputting two optical signals;
the optical signal processing device is located at an output end of the optical fiber array and is used for dispersing the two optical signals into sub-signals of different wavelengths and projecting the sub-signals of different wavelengths to different spectral band regions in the output selection device; and
the output selection device is located at a rear end of the optical signal processing device and is used for processing the sub-signals projected to the spectral band regions, so as to respectively perform output selection on the sub-signals dispersed from the two optical signals, thereby achieving a dual-switch function.

In one embodiment, the optical signal processing device comprises:
a lens array, comprising a plurality of lenses arranged in parallel, one of which is located at a rear end of the one dual-core optical fiber and is used for symmetrically outputting two optical signals output by the corresponding dual-core optical fiber with a central axis of the lens as a symmetry axis;
a beam expanding module, which is located at a rear end of the lens array and is used for respectively beam expanding the optical signals separated from each other by the lenses; and
a dispersion module, which is located at a rear end of the beam expanding module and is used for dispersing a same optical signal after being beam expanded by the beam expanding module into the sub-signals of different wavelengths; wherein the sub-signals of different wavelengths are projected to the different spectral band regions.

In an embodiment, a ratio between a spacing of the adjacent dual-core optical fibers in the fiber array and a light spot diameter $\varphi_l$ of one of the optical signals output via any one of the lenses is greater than a first set threshold, and $\varphi_l$ meets the following formula:

$$\phi_l = \frac{f_l \cdot \lambda}{\pi \cdot \phi_0};$$

where $f_l$ is a focal length of the lens, $\lambda$ is a center wavelength of the optical signal, and $\varphi_0$ is a light spot diameter corresponding to any one of the optical signals.

In an embodiment, the optical signal processing device further comprises:
a dispersion direction focusing module, which is located at a rear end of the dispersion module and is used for aggregating the sub-signals of different wavelengths and then projecting them to the different spectral band regions of the output selection device.

In one embodiment, the optical signal processing device further comprises:
a switching direction focusing module, which is located at a rear end of the dispersion module and is used for performing direction switching on the sub-signals in the different spectral band regions so as to increase a degree of separation of the different sub-signals.

In one embodiment, the dispersion module is located on an object-side focal plane of the dispersion direction focusing module, and the output selection device is located on an image-side focal plane of the dispersion direction focusing module; and
an object-side focal plane of the switching direction focusing module is confocal with an image-side focal plane of the lens; and the output selection device is located at an image-side focal plane of the switching direction focusing module.

In one embodiment, a dual-core spacing d in any one of the dual-core optical fibers meets the following formula:

$$d = \frac{f_l}{f_x} \cdot D;$$

where $f_l$ is a focal length of the lens, $f_x$ is a focal length of the switching direction focusing module, D is a spacing between the different spectral band regions, and a ratio of the D to a light spot diameter $\varphi_{wx}$ corresponding to the sub-signal whose direction have been switched via the switching direction focusing module is greater than a second set threshold.

In one embodiment, the switching direction focusing module and the dispersion direction focusing module both comprise refractive lenses or concave reflectors.

In one embodiment, the dispersion module comprises a transmission grating or a reflection grating.

In one embodiment, the output selection device comprises: a digital light processing DLP micro-reflector array, a silicon-based liquid crystal LCOS pixel unit array, or a liquid crystal unit array.

The technical solutions provided by the embodiments of the present disclosure may have the following beneficial effects:

In the embodiments of the present disclosure, by designing the optical fiber array, two optical signals are input by using a dual-core optical fiber, and are processed by the optical signal processing device, then are projected to the spectral band regions on the output selection device which do not interfere with each other, in order to control the sub-signals of different spectral band regions through the output selection device, thereby achieving a dual-switch function. As a result, on the one hand, the integration property is improved and the cost is saved, and on the other hand, only the optical fiber array needs to be designed, and the implementation mode is simple.

It is to be understood that the aforementioned general description and the following detailed description are exemplary and explanatory only, which cannot limit the present disclosure.

DETAILED DESCRIPTION

The technical solutions of the embodiments of the present disclosure will be clearly described below in conjunction with the accompanying drawings and the embodiments of the description.

Figure 1:
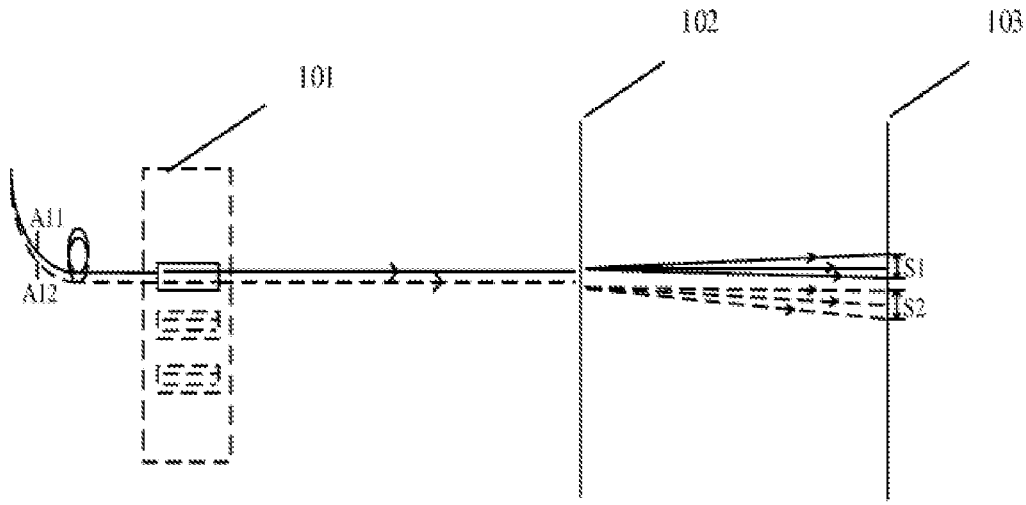
FIG. 1 is a structural diagram 1 of a wavelength selective switch shown in one embodiment of the present disclosure.

An embodiment of the present disclosure provides a wavelength selective switch, and FIG. 1 is a structural diagram 1 of a wavelength selective switch shown in an embodiment of the present disclosure. As shown in FIG. 1, in the embodiment of the present disclosure, a wavelength selective switch comprises an optical fiber array 101, an optical signal processing device 102, and an output selection device 103; wherein the optical fiber array 101 comprises multiple dual-core optical fibers arranged in parallel, any one of the dual-core optical fibers being used for inputting two optical signals;

the optical signal processing device 102 is located at an output end of the optical fiber array 101, and is used for dispersing two optical signals into sub-signals of different wavelengths, and projecting the sub-signals of different wavelengths into different spectral band regions in the output selection device 103; and the output selection device 103 is located at the rear end of the optical signal processing device 102, and is used for processing the sub-signals projected to the spectral band regions, so as to respectively perform output selection on the sub-signals split from the two optical signals, thereby realizing a dual-switch function.

In the embodiments of the present disclosure, each path in the optical fiber array 101 of the wavelength selective switch is a dual-core optical fiber, and two optical signals input by every dual-core optical fiber are respectively split by the optical signal processing device 102, and then independently control is respectively performed on the spectral band regions formed by every optical signal through the output selection device 103, thereby realizing the dual switch function.

The input optical signal comprises sub-signals of different wavelengths, therefore, two optical signals inputted through the dual-core optical fiber are split into sub-signals of different wavelengths based on the optical signal processing device 102 as described in the embodiments of the present disclosure. Meanwhile, the optical signal processing device 102 also projects the sub-signals with different wavelengths to different spectral band regions of the output selection device 103.

As shown in FIG. 1, two optical signals A11 and A12 are input into the optical fiber array 101, then are dispersed into multiple sub-signals (e.g. 6 paths) of different wavelengths after passing through the optical signal processing device 102, and then are projected to different spectral band regions of the output selection device 103. A spectral band region S1 comprises sub-signals of different wavelengths split by one optical signal, while a spectral band region S2 comprises sub-signals of different wavelengths split by another optical signal. It can be seen from FIG. 1 that the spectral band region S1 and the spectral band region S2 do not overlap with each other, thus, based on the output device 103, independent output selection control can be performed on the spectral band regions corresponding to the two optical signals after being split, thereby realizing the dual-switch function.

The output selection control of the output selection device 103 comprises: selecting a sub-signal to be output and adjusting output power of the sub-signal to be output.

It should be noted that, in the embodiments of the present disclosure, the optical path of the wavelength selective switch which is composed of the input optical fiber array 101, the optical signal processing device 102 and the output selection device 103 is reversible, which is shown as follows:

1. Two optical signals inputted from one dual-core optical fiber of the optical fiber array 101 are split into N sub-signals based on the optical signal processing device 102, while the sub-signals with different wavelengths are projected to different spectral band regions in the output selection device 103; and 2. The N sub-signals in the output selection device 103 are output through the selection of the output selection device 103, and one signal can be output based on the optical fiber array 101, wherein the one signal comprises one sub-signal of the N sub-signals which is reflected back, and further comprises one signal which is formed by multiple sub-signals in the N sub-signals after processed and coupled.

It can be understood that, in the embodiments of the present disclosure, two optical signals are inputted by using the optical fiber array 101 composed of the dual-core optical fibers to realize the function of the twin wavelength selective switch, which improves the integration property, and the implementation mode of which is simple.

Figure 2:
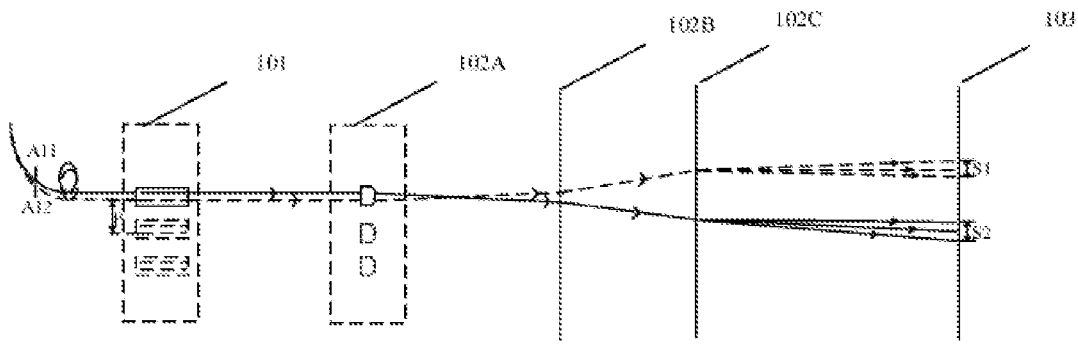
FIG. 2 is a structural diagram 2 of a wavelength selective switch shown in one embodiment of the present disclosure.

FIG. 2 is a structural diagram 2 of a wavelength selective switch shown in one embodiment of the present disclosure. As shown in FIG. 2, in the embodiment of the present disclosure, the optical signal processing device 102 comprises:

a lens array 102A, comprising a plurality of lenses arranged in parallel, one lens being located at a rear end of one dual-core optical fiber and used for symmetrically outputting two optical signals output by the corresponding dual-core optical fiber with a central axis of the lens being a symmetry axis;

a beam expanding module 102B, which is located at a rear end of the lens array 102A and is used for respectively performing beam expanding on the optical signals separated from each other by the lenses; and a dispersion module 102C, which is located at a rear end of the beam expanding module 102B and is used for splitting a same-path optical signal after being beam expanded by the beam expanding module 102B into sub-signals with different wavelengths; wherein the sub-signals with different wavelengths are projected to different spectral band regions.

It should be noted that the "rear end" mentioned in this application refers to the rear end along the transmission direction of the optical signal.

In the present embodiment, as shown in FIG. 2, one lens corresponds to one dual-core optical fiber, so as to symmetrically output the two optical signals A11 and A12 output through the dual-core optical fiber with the central axis of the lens as the symmetry axis. In addition, the beam expansion of the beam expanding module 102B refers to expanding the light spot size of the optical signal, and the optical signal after being beam expanded by the beam expanding module 102B is split into sub-signals with different wavelengths by the dispersion module 102C.

In one embodiment, in order to ensure the isolation requirements between adjacent ports in the wavelength selective switch of the dual-switches, a ratio between a spacing of the adjacent dual-core optical fibers in the fiber array 101 and the light spot diameter $\varphi_l$ of one optical signal output via one lens is greater than a first set threshold, and $\varphi_l$ meets the following formula:

$$\phi_l = \frac{f_l \cdot \lambda}{\pi \cdot \phi_0} \quad (1)$$

where $f_l$ is a focal length of the lens, $\lambda$ is a center wavelength of the input optical signal, and $\varphi_0$ is a light spot diameter corresponding to one optical signal.

It should be noted that, in the embodiments of the present disclosure, the diameters of different fiber cores are the same, therefore, the diameters of the light spots corresponding to the different optical signals are the same.

Exemplarily, as shown in FIG. 2, when the first set threshold is 1.5, the spacing P between the adjacent dual-core optical fibers is greater than 1.5 $\varphi_l$.

Figure 3:
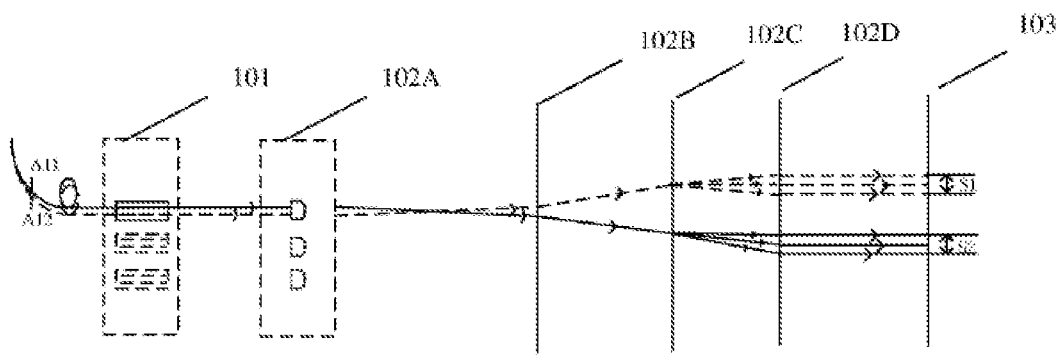
FIG. 3 is a structural diagram 3 of a wavelength selective switch shown in one embodiment of the present disclosure.

FIG. 3 is a structural diagram 3 of a wavelength selective switch shown in one embodiment of the present disclosure. As shown in FIG. 3, on the basis of the structure of the wavelength selective switch shown in FIG. 2, the optical signal processing device 102 further comprises:

a dispersion direction focusing module 102D, which is located at a rear end of the dispersion module 102C and is used for aggregating the sub-signals with different wavelengths belonging to different-path optical signals and projecting them to different spectral band regions of the output selection device 103.

As shown in FIG. 3, the sub-signals with different wavelengths corresponding to different optical signals pass through the dispersion module 102C, then are aggregated in the dispersion direction focusing module 102D, and then are respectively projected in parallel to a spectral band region S1 and a spectral band region S2 of the output selection device 103.

Figure 4:
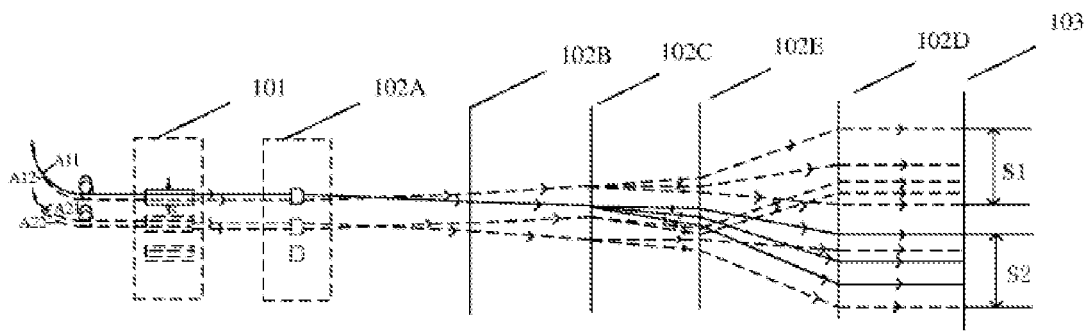
FIG. 4 is a structural diagram 4 of a wavelength selective switch shown in one embodiment of the present disclosure.

FIG. 4 is a structural diagram 4 of a wavelength selective switch shown in one embodiment of the present disclosure. As shown in FIG. 4, on the basis of the structure of the wavelength selective switch shown in FIG. 3, the optical signal processing device 102 further comprises:

a switching direction focusing module 102E which is located at a rear end of the dispersion module 102C and is used for performing direction switching on the sub-signals in different spectral band regions so as to increase the degree of separation of different sub-signals.

As shown in FIG. 4, the switching direction focusing module 102E is further used for aggregating the sub-signals with different wavelengths corresponding to the optical signals input by the fiber core belonging to the same core port sequence in different dual-core optical fibers, and then projecting them to the same spectral band region of the output selection device. Specifically, the optical signals A11 and A12 are output via one dual-core optical fiber, and the optical signals A21 and A22 are output via another dual-core optical fiber. The optical signals A11 and A21 belong to the same fiber core port arrangement sequence, and it can be seen from the plan view of FIG. 4 that they are both located at an upper fiber core port in one dual-core optical fiber. After being split into sub-signals with different wavelengths via the lens array 102A, the beam expanding module 102B, and the dispersion module 102C, the optical signals A11 and A21 are performed the direction switching by the switching direction focusing module 102E, and then are projected in parallel to spectral band regions S2 of the output selection device 103 via the dispersion direction focusing module 102D; After being split into sub-signals with different wavelengths via the lens array 102A, the beam expanding module 102B and the dispersion module 102C, the optical signals A12 and A22 are performed the direction switching by the switching direction focusing module 102E, and then are projected in parallel to the spectral band regions S1 of the output selection device 103 via the dispersion direction focusing module 102D.

In the present embodiment, the sub-signals in the different spectral band regions are performed direction switching through the switching direction focusing module 102E so as to increase the degree of separation of sub-signals, thus the spectral band regions S1 and S2 can be completely separated.

Based on the wavelength selective switch of the component type included in FIG. 3 and FIG. 4, in one embodiment, the dispersion module 102C is located on an object-side focal plane of the dispersion direction focusing module 102D, and the output selection device 103 is located on an image-side focal plane of the dispersion direction focusing module 102D;

an object-side focal plane of the switching direction focusing module 102E is confocal with an image-side focal plane of the lens; and the output selection device 103 is located at an image-side focal plane of the switching direction focusing module 102E.

In one embodiment, in order to ensure that different spectral band regions do not interfere with each other, a dual-core spacing d in any one of the dual-core optical fibers meets the following formula:

$$d = \frac{f_l}{f_x} \cdot D \quad (2)$$

where $f_l$ is a focal length of a lens, $f_x$ is a focal length of the switching direction focusing module 102E, D is a spacing between the different spectral band regions, and a ratio of the D to a light spot diameter $\varphi_{wx}$ corresponding to the sub-signal after being performed direction switching via the switching direction focusing module 102E is greater than a second set threshold, where $$\phi_{wx} = \frac{f_x}{f_l} \cdot \phi_0,$$

in which $\varphi_0$ is a light spot diameter corresponding to one optical signal.

It should be noted that, in the embodiment of the present disclosure, the light spot diameters of different optical signals output from the switching direction focusing module 102E are the same too.

Exemplarily, when the second set threshold is 1.5, the spacing D between different spectral band regions is greater than 1.5 $\varphi_{wx}$.

In one embodiment, both the switching direction focusing module 102E and the dispersion direction focusing module 102D include refractive lenses or concave reflectors.

In one embodiment, the dispersion module 102C includes a transmission grating or a reflection grating.

In one embodiment, the output selection device 103 comprises: a Digital light processing (Digital Light Processing, DLP) micro-reflector array, a liquid crystal on silicon (Liquid Crystal on Silicon, LCOS) pixel unit array, or a liquid crystal (liquid crystal, LC) unit array.

In one embodiment, when a core component of the output selection device 103 is a digital light processing DLP micro-reflector, the sub-signal to be output is selected through adjusting the angle of the micro-reflector, meanwhile, the adjustment of the output power can be realized through adjusting whether the sub-signal is completely aligned with the output port.

In another embodiment, when a core component of the output selection device 103 is a silicon-based liquid crystal LCOS pixel unit array, the selection of the sub-signals is realized by independently controlling different liquid crystal pixels of the LCOS, meanwhile, the voltage is applied to the pixel points at the selected liquid crystal pixel position so as to change the refractive index of the corresponding liquid crystal to change the phase, i.e. realizing the power adjustment.

It can be understood that, in the embodiments of the present disclosure, two optical signals are inputted by using the dual-core optical fiber, and the spectral band regions which do not interfere with each other are formed based on the optical elements including lens array 102A, the beam expanding module 102B, the dispersion module 102C, the dispersion direction focusing module 102D, and the switching direction focusing module 102E to realize the function of the twin wavelength selective switch. As such, on the one hand, the number of optical components is small, which avoids excessive increase in size, and improves integration property and saves costs; on the other hand, only the optical fiber array needs to be designed, and the implementation mode is simple.

Figure 5:
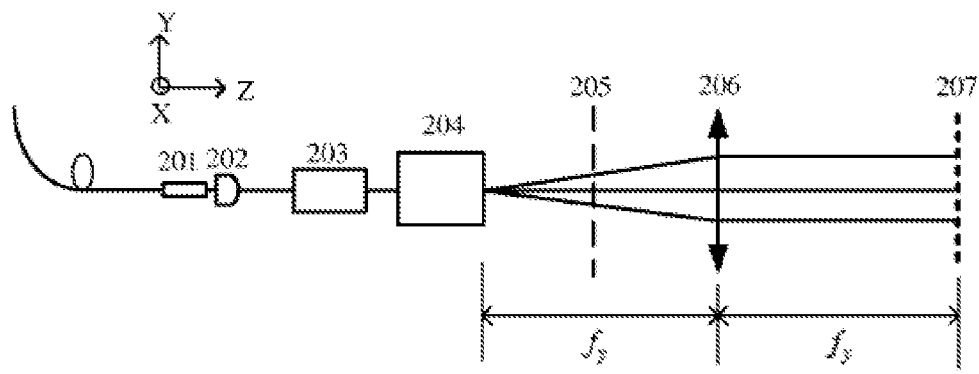
FIG. 5 is an optical path structural diagram 1 of a wavelength selective switch in a dispersion direction according to an embodiment of the present disclosure.

Exemplarily, FIG. 5 is an optical path structural diagram 2 of a wavelength selective switch in the dispersion direction according to an embodiment of the present disclosure. As shown in FIG. 5, a twin wavelength selective switch includes a dual-core optical fiber array 201, a micro-lens array 202, a beam expanding module 203, a dispersion module 204, a switching direction focusing module 205, a dispersion direction focusing module 206, and an attenuation switching spectrum segmenting device 207 arranged sequentially, wherein the attenuation switching spectrum segmenting device 207 is exactly the output selection device 103 of the present disclosure. In the dispersion direction, the optical path process thereof is specifically as follows: the light incident from the dual-core optical fiber array 201 and via the micro-lens array 202 is beam expanded by the beam expanding module 203, and then is split by the dispersion module 204 into multi-wavelength optical signals distributed according to an angle, wherein the multi-wavelength optical signals is the sub-signals with different wavelengths after being dispersed.

As shown in FIG. 5, the focal length of the dispersion direction focusing module 206 is $f_y$; the dispersion module 204 is located at the front focal plane of the dispersion direction focusing module 206; the attenuation switching spectrum segmenting device 207 is located on the rear focal plane of the dispersion direction focusing module 206; the multi-wavelength optical signals after being split are then projected in parallel to the attenuation switching spectrum segmenting device 207 through the dispersion direction focusing module 206; and optical signals with different wavelengths are projected to different spectral band positions of the spectral segmenting device, and occupy a corresponding number of spectrum segmenting device control units according to bandwidth requirements. The parallel light region on the attenuation switching spectrum segmenting device 207 is a spectral band region.

Figure 6:
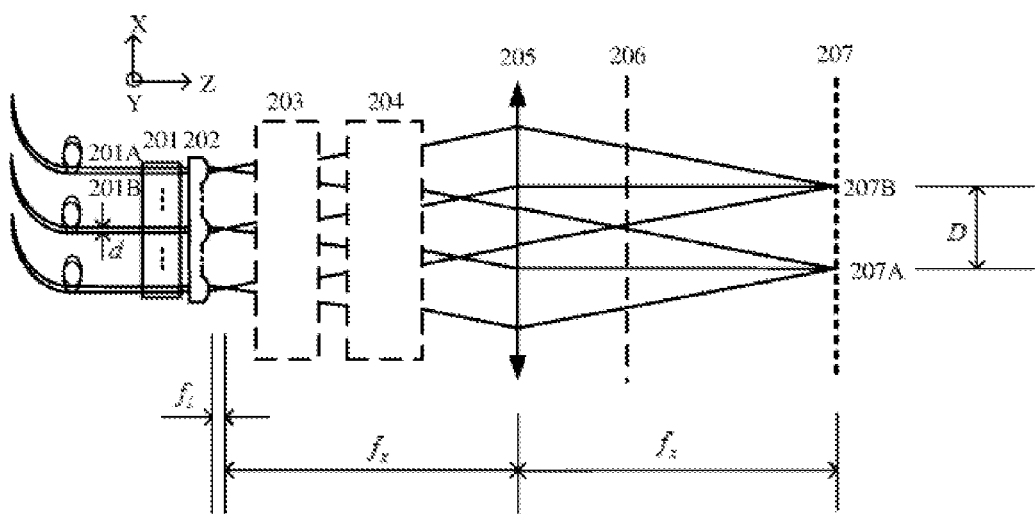
FIG. 6 is an optical path structural diagram 2 of a wavelength selective switch in the switching direction according to an embodiment of the present disclosure.

Exemplarily, FIG. 6 is an optical path structural diagram 2 of a wavelength selective switch in the switching direction according to an embodiment of the present disclosure. As shown in FIG. 6, the focal length of the switching direction focusing module 205 is $f_x$; the focal length of the micro-lens array 202 is $f_l$; the front focal plane of the switching direction focusing module 205 is confocal with the rear focal plane of the micro-lens array 102; the attenuation switching spectrum segmenting device 207 is located at the rear focal plane of the switching direction focusing module 205; the dual-core spacing is d; and the spacing between the spectral band regions corresponding to the two wavelength selective switches on the attenuation switching spectrum segmenting device 207 is D.

In the switching direction, every dual-core optical fiber includes two input/output ports respectively from two wavelength selective switches. Herein, the two input/output ports refer to the two fiber cores in one dual-core optical fiber. The two input optical signals are processed by the micro-lens array 202, the beam expanding module 203, the dispersion module 204, the switching direction focusing module 205, and the dispersion direction focusing module 206, and then form control regions corresponding to the two spectral band regions on the attenuation switching spectrum dividing device 207. The light incident via the two input/output ports will be respectively projected to the different positions of the attenuation switching spectrum segmenting device 207 in switching directions; as shown in FIG. 6, the light incident from the port 201A of the dual-core optical fiber will be projected to the position 207A at the attenuation switching spectrum segmenting device 207, while the light of the port 201B is projected to the position 207B.

It should be noted that port 201A and port 201B respectively belong to two different wavelength selective switches, and 207A and 207B respectively correspond to one spectral band region. Thus the optical signals from the two wavelength selective switches will be projected to two different positions on the attenuation switching spectrum segmenting device 207, and the light of the same wavelength selective switch will be aggregated to the same spectral band region of the attenuation switching spectrum segmenting device 207, and then the mutual independent control of the two wavelength selection switches in the twin structure is realized.

It can be understood that, in the embodiment of the present disclosure, a dual-core optical fiber is used to input two optical signals, and spectral band regions which do not interfere with each other are formed on the basis of an existing optical element, so as to realize the function of the twin wavelength selective switch. As a result, on the one hand, there is no need to add additional optical elements, which avoids excessive increase in size, and improves integration property and saves costs, and on the other hand, only the optical fiber array needs to be designed, and the implementation mode is simple.

In the several embodiments provided in the present disclosure, it should be understood that the disclosed device and method may be implemented in other manners. The device embodiments as described above are only schematic; for example, the division of the units is merely a logical function division, and in actual implementation, there may be another division mode, e.g. multiple units or components may be combined, or may be integrated into another system, or some features may be ignored or not performed. In addition, the coupling, or direct coupling, or communication connection between the various components shown or discussed may be through some interfaces, and indirect coupling or communication connection of devices or units may be electrical, mechanical or otherwise.

The units described above as separating components may or may not be physically separate, components displayed as units may or may not be physical units, i.e. they may be located in one place or distributed over multiple network units; and some or all of the units may be selected according to actual needs to realize the purpose of the solution in the present embodiments.

In addition, each functional unit in each embodiment of the present disclosure may all be integrated into one processing module, or each unit may be separately used as a unit, or two or more units may be integrated into one unit; the above-mentioned integrated unit may be implemented in a form of hardware, or may be implemented in a form of a hardware plus software functional units. Those skilled in the art may understand that: all or some of the steps of implementing the method embodiments may be completed by means of hardware related to a program instruction, and the aforementioned program may be stored in a computer-readable storage medium, and when the program is executed, the steps including the above method embodiments are executed; while the aforementioned storage medium includes: various media that can store program codes, such as a removable storage device, a read-only memory (ROM, Read-Only Memory), a random access memory (RAM, Random Access Memory), a magnetic disk or an optical disk.

The method disclosed in the several method embodiments provided in the present disclosure may be arbitrarily combined without conflict to obtain new method embodiments.

The features disclosed in the several method or device embodiments provided in the present disclosure may be combined arbitrarily without conflict to obtain new product embodiments.

The features disclosed in several method or device embodiments provided in the present disclosure may be combined arbitrarily without conflict to obtain new method embodiments or device embodiments.

The above description is only specific embodiments of the present disclosure, however, the protection scope of the present disclosure is not limited to it, and any person skilled in the art can easily think of changes or substitutions within the technical scope as disclosed by the present disclosure, and which should be included within the protection scope of the present disclosure. Therefore, the protection scope of the present disclosure should be subject to the protection scope of the present disclosure.

What is claimed is:

1. A wavelength selective switch, comprising an optical fiber array, an optical signal processing device, and an output selection device; wherein
   the optical fiber array comprises multiple dual-core optical fibers arranged in parallel, any one of the dual-core optical fibers being used for inputting two optical signals;
   the optical signal processing device is located at an output end of the optical fiber array, and is used for dispersing each of the two optical signals into sub-signals with different wavelengths, and projecting the sub-signals with different wavelengths to one of two different spectral band regions in the output selection device, forming two spectral band regions which do not interfere with each other in the output selection device; and
   the output selection device is located at a rear end of the optical signal processing device, and is used for processing the sub-signals projected to the spectral band regions, so as to respectively perform output selection on the sub-signals dispersed from the two optical signals, thereby achieving a dual-switch function.

2. The wavelength selective switch of claim 1, wherein the optical signal processing device comprises:
   a lens array, comprising a plurality of lenses arranged in parallel, one of which is located at a rear end of the one dual-core optical fiber and is used for symmetrically outputting the two optical signals output by the corresponding dual-core optical fiber with a central axis of the lens as a symmetry axis;
   a beam expanding module, which is located at a rear end of the lens array, and is used for respectively performing beam expanding on the optical signals separated from each other by the lenses;
   a dispersion module, which is located at a rear end of the beam expanding module, and is used for dispersing a same optical signal after being beam expanded by the beam expanding module into the sub-signals with different wavelengths; wherein the sub-signals with different wavelengths are projected to the different spectral band regions.

3. The wavelength selective switch of claim 2, wherein a ratio between a spacing of adjacent dual-core optical fibers in the fiber array and a light spot diameter $\varphi_l$ of any one of the optical signals output via one of the lenses is greater than a first set threshold, and $\varphi_l$ meets the following formula:

$$\phi_l = \frac{f_l \cdot \lambda}{\pi \cdot \phi_0};$$

where $f_l$ is a focal length of the lens; $\lambda$ is a center wavelength of the optical signal; and $\varphi_0$ is a light spot diameter corresponding to any one of the optical signals.

4. The wavelength selective switch of claim 2, wherein the optical signal processing device further comprises:
a dispersion direction focusing module, which is located at a rear end of the dispersion module, and is used for projecting the sub-signals with different wavelengths to the different spectral band regions of the output selection device after they are aggregated.

5. The wavelength selective switch of claim 4, wherein the optical signal processing device further comprises:
a switching direction focusing module, which is located at a rear end of the dispersion module, and is used for performing direction switching on the sub-signals in the different spectral band regions so as to increase a degree of separation of the different sub-signals.

6. The wavelength selective switch of claim 5, wherein the dispersion module is located on an object-side focal plane of the dispersion direction focusing module, and the output selection device is located on an image-side focal plane of the dispersion direction focusing module;
an object-side focal plane of the switching direction focusing module is confocal with an image-side focal plane of the lens; and
the output selection device is located at an image-side focal plane of the switching direction focusing module.

7. The wavelength selective switch of claim 6, wherein a dual-core spacing d in any one of the dual-core optical fibers meets a following formula:

$$\phi_l = \frac{f_l \cdot \lambda}{\pi \cdot \phi_0};$$

where $f_l$ is a focal length of the lens; $f_x$ is a focal length of the switching direction focusing module; D is a spacing between the different spectral band regions; and a ratio of the D to a light spot diameter $\varphi_{wx}$ corresponding to the sub-signal after being performed direction switching via the switching direction focusing module is greater than a second set threshold.

8. The wavelength selective switch of claim 5, wherein the switching direction focusing module and the dispersion direction focusing module both comprise refractive lenses or concave reflectors.

9. The wavelength selective switch of claim 2, wherein the dispersion module comprises a transmission grating or a reflection grating.

10. The wavelength selective switch of claim 1, wherein the output selection device comprises:
a digital light processing DLP micro-reflector array, a silicon-based liquid crystal LCOS pixel unit array, or a liquid crystal unit array.

11. The wavelength selective switch of claim 5, wherein the switching direction focusing module is further used for aggregating the sub-signals with different wavelengths corresponding to the optical signals input by a fiber core belonging to a same core port sequence in different dual-core optical fibers, and then projecting them to the same spectral band region of the output selection device.

* * * * *